(12) United States Patent
Higashiyama et al.

(10) Patent No.: US 11,009,702 B2
(45) Date of Patent: May 18, 2021

(54) DISPLAY DEVICE, DISPLAY CONTROL METHOD, STORAGE MEDIUM

(71) Applicant: HONDA MOTOR CO., LTD., Tokyo (JP)

(72) Inventors: Masafumi Higashiyama, Wako (JP); Takuya Kimura, Wako (JP); Tatsuya Iwasa, Wako (JP); Shinji Kawakami, Wako (JP); Yuji Kuwashima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 37 days.

(21) Appl. No.: 16/527,197

(22) Filed: Jul. 31, 2019

(65) Prior Publication Data
US 2020/0049984 A1 Feb. 13, 2020

(30) Foreign Application Priority Data
Aug. 7, 2018 (JP) .............................. JP2018-148335

(51) Int. Cl.
| | |
|---|---|
| *G02B 27/01* | (2006.01) |
| *G06T 11/60* | (2006.01) |
| *G09G 3/00* | (2006.01) |
| *B60K 35/00* | (2006.01) |

(52) U.S. Cl.
CPC .......... *G02B 27/0101* (2013.01); *B60K 35/00* (2013.01); *G02B 27/0149* (2013.01); *G06T 11/60* (2013.01); *G09G 3/001* (2013.01); *B60K 2370/1529* (2019.05); *B60K 2370/167* (2019.05); *B60K 2370/31* (2019.05); *B60K 2370/52* (2019.05); *G02B 2027/014* (2013.01); *G02B 2027/0159* (2013.01)

(58) Field of Classification Search
CPC ...... G02B 2027/012; G02B 2027/0185; G02B 27/0101
See application file for complete search history.

(56) References Cited

U.S. PATENT DOCUMENTS

| | | | | |
|---|---|---|---|---|
| 2016/0313562 | A1* | 10/2016 | Saisho | G02B 27/0179 |
| 2017/0240109 | A1* | 8/2017 | Kimura | G08G 1/167 |
| 2017/0357088 | A1* | 12/2017 | Matsuzaki | B60K 35/00 |
| 2018/0017791 | A1* | 1/2018 | Beckman | G02B 27/0103 |

FOREIGN PATENT DOCUMENTS

JP 2017-091115 5/2017

* cited by examiner

*Primary Examiner* — Ming Wu
(74) *Attorney, Agent, or Firm* — Amin, Turocy & Watson, LLP

(57) ABSTRACT

A display device includes a controller configured to cause the image generator to generate a virtual image on the basis of at least a state of a vehicle and to adjust the depression angle on the basis of a reception result of a first receptor configured to receive adjustment of the depression angle of the position at which the virtual image is visually recognized by the viewer, wherein, when the depression angle has been adjusted on the basis of a reception result of the first receptor in a case in which the virtual image visual recognition distance is not a predetermined distance, the controller is configured to set the adjusted depression angle as a minimum depression angle and is configured to cause the image generator to generate a virtual image such that the depression angle does not become less than the set minimum depression angle.

14 Claims, 16 Drawing Sheets

DISPLAY DEVICE, DISPLAY CONTROL METHOD, STORAGE MEDIUM

CROSS-REFERENCE TO RELATED APPLICATION

Priority is claimed on Japanese Patent Application No. 2018-148335, filed Aug. 7, 2018, the content of which is incorporated herein by reference.

BACKGROUND

Field

The following embodiments relates to a display device, a display control method, and a storage medium.

Description of Related Art

Conventionally, a head up display device (hereinafter referred to as an HUD device) that displays images about basic information for drivers on a front windshield is known (for example, Patent Document 1). Using this HUD device, the driver is able to ascertain various pieces of displayed information while maintaining a direction of a line of sight to the front at the time of driving by displaying various marks indicating an obstacle, a reminder, and a progress direction superimposed on a landscape in front of a vehicle (Japanese Unexamined Patent Application First Publication No. 2017-91115).

However, there are cases in which information display states are not suited for preferences of an occupant in the conventional technology.

SUMMARY

An object of the following embodiments devised in view of the aforementioned circumstances is to provide a display device capable of providing information in a display state suited for preferences of an occupant, a display control method, and a storage medium.

A display device, a display control method and a storage medium according to the aspect employ the following configurations.

(1): A display device according to one aspect includes: an image generator configured to generate a virtual image overlaid on a landscape and visually recognized by a viewer by outputting light including an image to a reflector which reflects incident light to the eyes of the viewer and able to adjust a virtual image visual recognition distance from a predetermined position to a position at which the light is formed as the virtual image and a depression angle of a position at which the virtual image is visually recognized by the viewer; a first receptor configured to receive adjustment of the depression angle of the position at which the virtual image is visually recognized by the viewer; and a controller configured to cause the image generator to generate a virtual image on the basis of at least a state of a vehicle and to adjust the depression angle on the basis of a reception result of the first receptor, wherein, when the depression angle has been adjusted on the basis of a reception result of the first receptor in a case in which the virtual image visual recognition distance is not a predetermined distance, the controller is configured to set the adjusted depression angle as a minimum depression angle and is configured to cause the image generator to generate a virtual image such that the depression angle does not become less than the set minimum depression angle.

(2): In the aforementioned aspect (1), the controller is configured to cause the image generator to generate the virtual image at a first depression angle at a first virtual image visual recognition distance, when the depression angle has been adjusted to a second depression angle greater than the first depression angle on the basis of a reception result of the first receptor, set the adjusted second depression angle as a minimum depression angle and cause the image generator to generate a virtual image such that the depression angle does not become less than the set minimum depression angle, and cause the image generator to generate a virtual image such that the depression angle of the position of the virtual image becomes a depression angle less than the minimum depression angle at a virtual image visual recognition distance different from the first virtual image visual recognition distance when the minimum depression angle has not been set.

(3): In the aforementioned aspect (1) or (2), the state of the vehicle is a speed of the vehicle, and the controller is configured to increase the virtual image visual recognition distance as the speed of the vehicle increases.

(4): In any of the aforementioned aspects (1) to (3), the predetermined distance is a minimum virtual image visual recognition distance set in advance.

(5): In any of the aforementioned aspects (1) to (4), the controller is configured to set the depression angle on the basis of set control information among a plurality of pieces of control information in which a relationship between the virtual image visual recognition distance and the depression angle has been set, and at least the state of the vehicle.

(6): In the aforementioned aspect (5), the controller is configured to cause the image generator to generate a virtual image without changing the depression angle at a virtual image visual recognition distance equal to or greater than a second virtual image visual recognition distance and cause the image generator to generate a virtual image on the basis of the control information at a virtual image visual recognition distance less than the second virtual image visual recognition distance, and the second virtual image visual recognition distance is a distance associated with a depression angle associated with the set minimum depression angle in the control information.

(7): In the aforementioned aspect (5), the controller is configured to cause the image generator to generate a virtual image without changing the depression angle when the adjusted depression angle has been set as a minimum depression angle.

(8): In any of the aforementioned aspects (1) to (7), when the adjusted depression angle has been set as a minimum depression angle, and the image generator has been caused to end a process of generating the virtual image and then caused to start the process of generating a virtual image again, the controller is configured to cause the image generator to generate a virtual image such that the depression angle does not become less than the set minimum depression angle.

(9): In the aforementioned aspect (8), the display device further includes a second receptor configured to receive information on whether to cause the image generator to generate a virtual image such that the depression angle does not become less than the set minimum depression angle when the image generator is caused to start the process of generating a virtual image again, and the controller is configured to cause the image generator to generate a virtual image such that the depression angle does not become less than the set minimum depression angle when information on causing the image generator to generate a virtual image such that the depression angle does not become less than the set minimum depression angle is received through the second receptor.

(10): In any of the aforementioned aspects (1) to (9), the display device includes: a light projection device configured to output the image as light; an optical mechanism provided on a path of the light and configured to be able to adjust a distance from a predetermined position to a position at which the light is formed as a virtual image; a concave mirror configured to reflect light passing through the optical mechanism toward a reflector; a first actuator configured to adjust the position in the optical mechanism; and a second actuator configured to adjust a reflection angle of the concave mirror.

(11): A display control method using a computer, the computer method comprising: causing an image generator configured to generate a virtual image overlaid on a landscape and visually recognized by a viewer by outputting light including an image to a reflector which reflects incident light to the eyes of the viewer on the basis of at least a state of a vehicle and able to adjust a virtual image visual recognition distance from a predetermined position to a position at which the light is formed as the virtual image and a depression angle of a position at which the virtual image is visually recognized by the viewer to generate a virtual image; adjusting the depression angle on the basis of a reception result of a receptor configured to receive adjustment of the depression angle of the position at which the virtual image is visually recognized by the viewer; when the depression angle has been adjusted on the basis of a reception result of the receptor in a case in which the virtual image visual recognition distance is not a predetermined distance, setting the adjusted depression angle as a minimum depression angle; and causing the image generator to generate a virtual image such that the depression angle does not become less than the set minimum depression angle.

(12): A non-transitory computer-readable storage medium that stores a computer program to be executed by a computer to perform at least: cause an image generator configured to generate a virtual image overlaid on a landscape and visually recognized by a viewer by outputting light including an image to a reflector which reflects incident light to the eyes of the viewer on the basis of at least a state of a vehicle and able to adjust a virtual image visual recognition distance from a predetermined position to a position at which the light is formed as the virtual image and a depression angle of a position at which the virtual image is visually recognized by the viewer to generate a virtual image; adjust the depression angle on the basis of a reception result of a receptor configured to receive adjustment of the depression angle of the position at which the virtual image is visually recognized by the viewer; when the depression angle has been adjusted on the basis of a reception result of the receptor in a case in which the virtual image visual recognition distance is not a predetermined distance, to set the adjusted depression angle as a minimum depression angle; and cause the image generator to generate a virtual image such that the depression angle does not become less than the set minimum depression angle.

According to the aspects (1) to (12), it is possible to provide information in a display state suited for preferences of an occupant.

DETAILED DESCRIPTION

Hereinafter, embodiments of a display device, a display control method, and a storage medium will be described with reference to the attached drawings. For example, the display device is a device that is mounted in a vehicle (hereinafter referred to as a vehicle M) and causes an image to be overlaid on a landscape and visually recognized. The display device can be referred to as an HUD device. As an example, the display device is a device that allows a viewer to visually recognize a virtual image by projecting light including an image to a front windshield of the vehicle M. The viewer is a driver, for example. The viewer may be an occupant other than a driver. The display device may be realized by being projected to a transparent member (a visor, a lens of glasses, or the like) included in a device mounted on the body of a person. In the following description, the display device is regarded as a device that is mounted in the vehicle M and projects light including an image to the front windshield.

In the following description, positional relationships and the like will be described appropriately using an XYZ coordinate system. In the following description, there are cases in which a "virtual image" is referred to as an "image."

[Overall Configuration]

Figure 1:
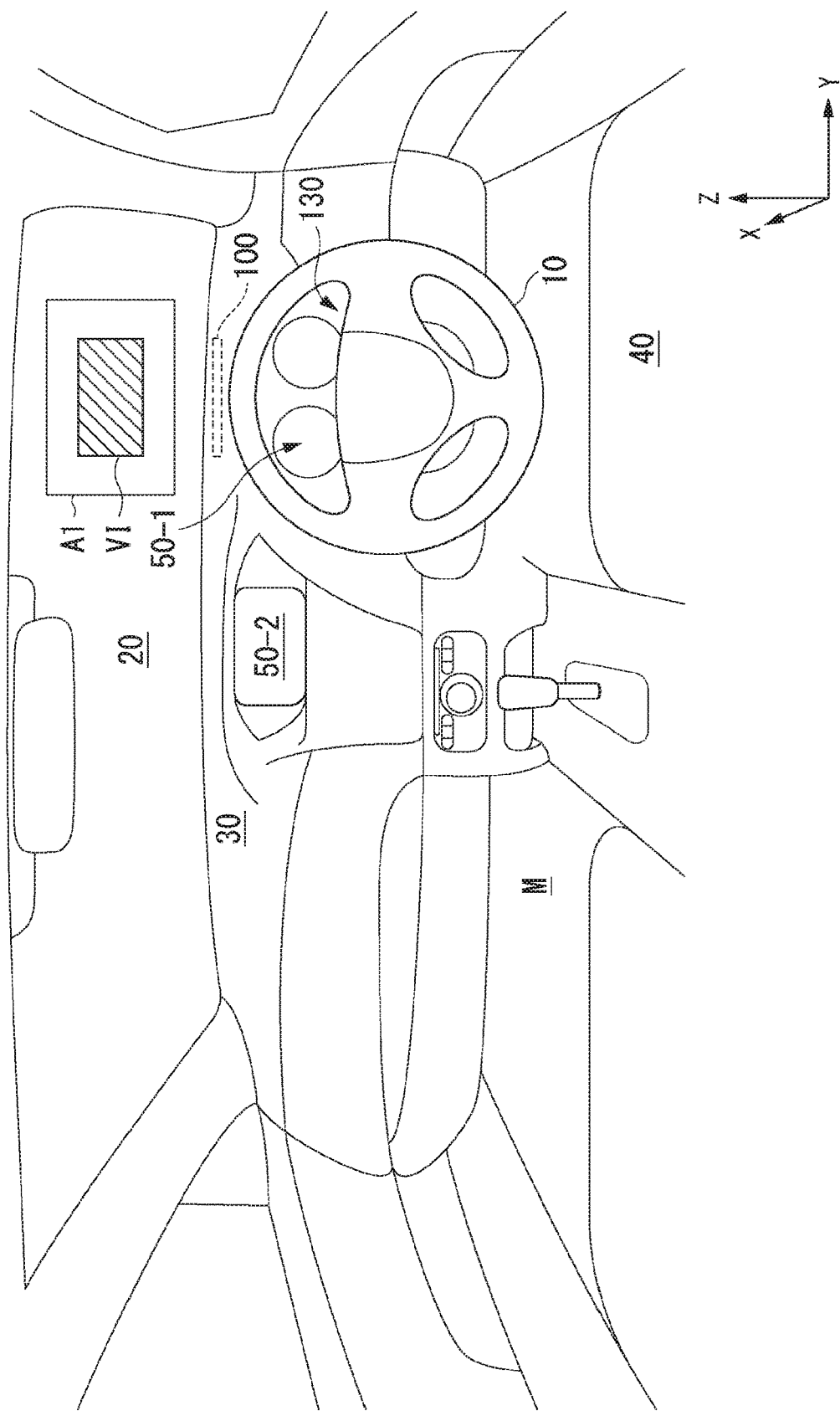
FIG. 1 is a diagram showing an exemplary example of a constitution of an interior of a vehicle M on which a display device according to an embodiment is mounted.

FIG. 1 is a diagram showing an exemplary example of a constitution of an interior of a vehicle M on which a display device 100 according to an embodiment is mounted. A steering wheel 10 that controls steering of the vehicle M, a front windshield (an example of a reflector) 20 that separates the inside of the vehicle from the outside of the vehicle, and an instrument panel 30 are provided in the vehicle M, for example. The front windshield 20 is a member having optical transparency. For example, the display device 100 allows a driver sitting on a driver's seat 40 to visually recognize a virtual image VI by projecting light including an image on a displayable area A1. The displayable area A1 is an area included in a part of the front windshield 20 in front of the driver's seat 40.

The display device 100 allows a driver to visually recognize a picture (image) including information for assisting a driver with driving and information about a predetermined event as the virtual image VI, for example. The information for assisting a driver with driving may include, for example, information such as the speed of the vehicle M, a driving force distribution ratio, an engine RPM, an operating state shift position of driving assistance functions, sign recognition results, and positions of intersections. The driving assistance functions include, for example, a direction indication function, adaptive cruise control (ACC), a lane keep assistant system (LKAS), a collision mitigation brake system (CMBS), a traffic jam assist function, and so on.

A first displayer 50-1 and a second displayer 50-2 may be provided in the vehicle M in addition to the display device 100. The first displayer 50-1 is a display device. For example, the first displayer 50-1 is provided on the instrument panel 30 near the front of the driver's seat 40. The first displayer 50-1 is visually recognizable by a driver through a hole of the steering wheel 10 or over the steering wheel 10. The second displayer 50-2 is attached to the center of the instrument panel 30, for example. The second displayer 50-2 displays images associated with navigation processing performed through a navigation device (not shown) mounted in the vehicle M, images of counterparts in a videophone, or the like, for example. The second displayer 50-2 may display television programs, play DVDs and display content such as downloaded images.

The vehicle M is equipped with an operation switch (an example of an operator) 130 that receives an instruction for switching display of the display device 100 on/off and an instruction for adjusting the position of the virtual image VI. For example, the operation switch 130 is attached to a position at which a driver sitting on the driver's seat 40 can operate the operation switch 130 without largely changing their posture. The operation switch 130 may be provided in front of the first displayer 50-1 or on a boss of the steering wheel 10, for example. The operation switch 130 may be provided on a spoke that connects the steering wheel 10 and the instrument panel 30.

Figure 2:
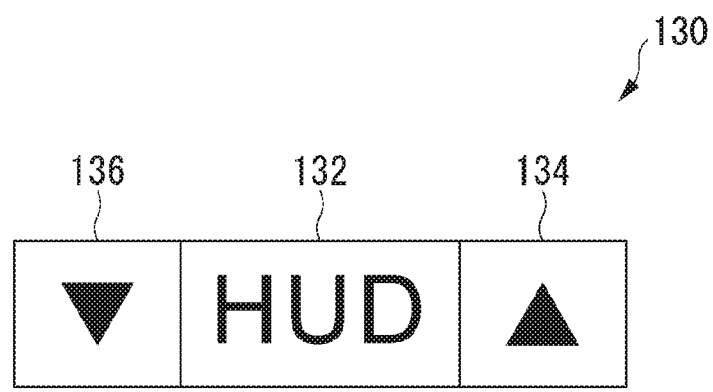
FIG. 2 is a diagram showing an operation switch of embodiments.

FIG. 2 is a diagram showing the operation switch 130 of embodiments. The operation switch 130 is a switch including a main switch 132, an adjustment switch 134, and an adjustment switch 136, for example. The main switch 132 is a switch for switching the display device 100 on/off.

For example, the adjustment switch 134 is a switch for receiving an instruction for moving the position of the virtual image VI upward in the vertical direction Z (hereinafter referred to as an upward direction). The position of the virtual image VI is that the virtual image VI is visually recognized to be in a space penetrating the front windshield 20 from a line of sight position F1 of a driver. The driver can continuously move a position at which the virtual image VI is visually recognized within the displayable area A1 upward by continuing to press the adjustment switch 134.

The adjustment switch 136 is a switch for receiving an instruction for moving the aforementioned position of the virtual image VI downward in the vertical direction Z (hereinafter referred to as a downward direction). The driver can continuously move a position at which the virtual image VI is visually recognized within the displayable area A1 downward by continuing to press the adjustment switch 136.

The adjustment switch 134 may be a switch for increasing the luminance of the visually recognized virtual image VI instead of (or in addition to) moving the position of the virtual image VI upward. The adjustment switch 136 may be a switch for decreasing the luminance of the visually recognized virtual image VI instead of (or in addition to) moving the position of the virtual image VI downward. Details of instructions received through the adjustment switches 134 and 136 may be switched on the basis of some operations. Some operations may include an operation of long pressing the main switch 132, for example. The operation switch 130 may include, for example, a switch for selecting displayed details and a switch for adjusting the luminance and size of an exclusively displayed virtual image in addition to each switch shown in FIG. 2.

Figure 3:
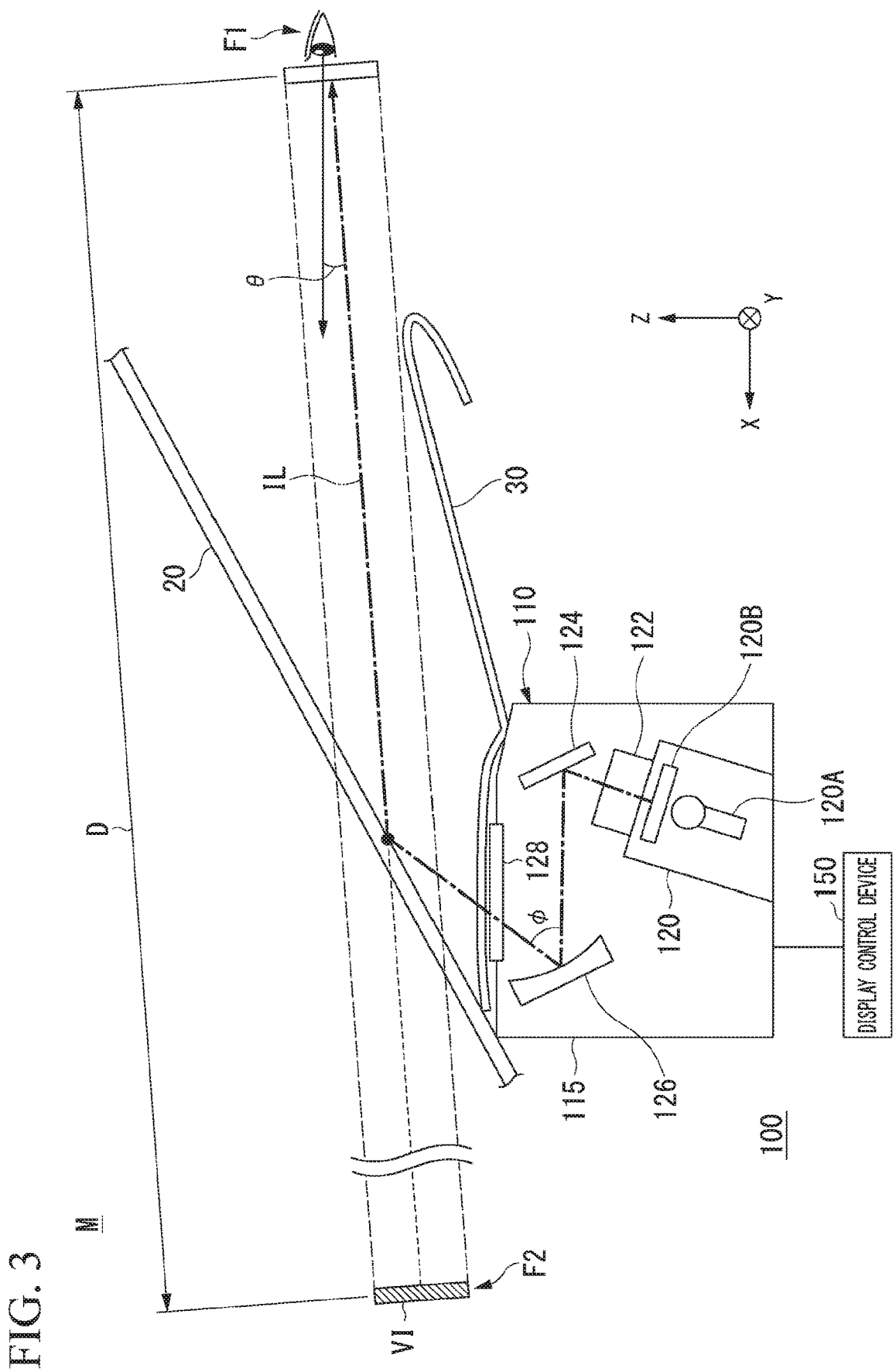
FIG. 3 is a diagram showing a partial configuration of the display device.

FIG. 3 is a diagram showing a partial configuration of the display device 100. For example, the display device 100 includes a display 110 and a display control device 150. The display 110 has a housing 115, for example. The housing 115 accommodates a light projection device 120, an optical mechanism 122, a plane mirror 124, a concave mirror 126, and a light transmission cover 128. Although the display device 100 includes various sensors and actuators in addition to these components, they will be described later. The display device 100 may have a configuration in which the optical mechanism 122 is not provided.

The light projection device 120 includes a light source 120A and a display element 120B, for example. The light source 120A is a cold cathode tube, for example, and outputs visible light associated with the virtual image VI to be visually recognized by a driver. The display element 120B controls transmission of the visible light output from the light source 120A. For example, the display element 120B is a thin film transistor (TFT) type liquid crystal display (LCD). Each of a plurality of pixels included in the display element 120B is controlled to control a degree of transmission of each color element of the visible light output from the light source 120A. Accordingly, a form (appearance) of the virtual image VI is determined. Visible light that transmits the display element 120B and includes an image is referred to below as image light IL. When the display element 120B is an organic EL display, the light source 120A may be omitted.

The optical mechanism 122 is provided on a path of light output from the light projection device 120. The optical mechanism 122 adjusts a distance from a predetermined position to a position at which light is formed as a virtual image. For example, the optical mechanism 122 includes one or more lenses. The position of each lens can be adjusted in an optical-axis direction, for example. The optical mechanism 122 is provided on a path of the image light IL output from the light projection device 120, for example. The optical mechanism 122 passes the image light IL input from the light projection device 120 and projects the image light IL toward the front windshield 20. For example, the optical mechanism 122 can adjust a distance from the line of sight position F1 of the driver to a formation position F2 at which the image light IL is formed as a virtual image (hereinafter referred to as a virtual image visual recognition distance D) by changing lens positions. The line of sight position F1 of the driver is a position at which the image light IL reflected by the concave mirror 126 and the front windshield 20 is condensed and is a position at which the eyes of the driver are assumed to be present. Although, strictly speaking, the virtual image visual recognition distance D is the distance of a line segment having a vertical inclination, the distance may refer to a distance in the horizontal direction. In the following description, when "the virtual image visual recognition distance D is 7 m" or the like is represented, the distance may be a distance of the aforementioned line segment or a distance in the horizontal direction.

In the following description, a depression angle θ is defined as a formation angle. The formed angle is an angle formed between a horizontal plane passing through the line of sight position F1 and a line segment from the line of sight position F1 of the driver to the formation position F2. The more the virtual image VI is formed downward, that is, the more downward the line of sight direction at which the driver views the virtual image VI, the larger the depression angle θ. The depression angle θ is determined on the basis of a reflection angle φ of the concave mirror 126 and a display position of an original image in the display element 120B. The reflection angle φ is an angle formed between an incident direction in which the image light IL reflected by the plane mirror 124 is input to the concave mirror 126 and a projection direction in which the concave mirror 126 projects the image light IL.

The plane mirror 124 reflects visible light (i.e., the image light IL) that has been emitted from the light source 120A and passed through the display element 120B in the direction of the concave mirror 126.

The concave mirror 126 reflects the image light IL input from the plane mirror 124 and projects the reflected image light IL to the front windshield 20. The concave mirror 126 is supported so as to be rotatable (pivotable) on the Y axis that is an axis in the width direction of the vehicle M.

The light transmission cover 128 transmits the image light IL guided by the concave mirror 126 to cause the image light IL to arrive at the front windshield 20 and prevent a foreign matter such as dust, dirt or a water droplet from infiltrating into the housing 115. The light transmission cover 128 includes an opening formed in an upper member of the housing 115. The instrument panel 30 also includes an opening or an optical transparent member, and the image light IL passes through the light transmission cover 128 and is transmitted by the opening or the optical transparent member of the instrument panel 30 to arrive at the front windshield 20.

The image light IL input to the front windshield 20 is reflected by the front windshield 20 and condensed at the line of sight position F1 of the driver. Here, the driver perceives an image projected by the image light IL as being displayed in front of the vehicle M.

Figure 4:
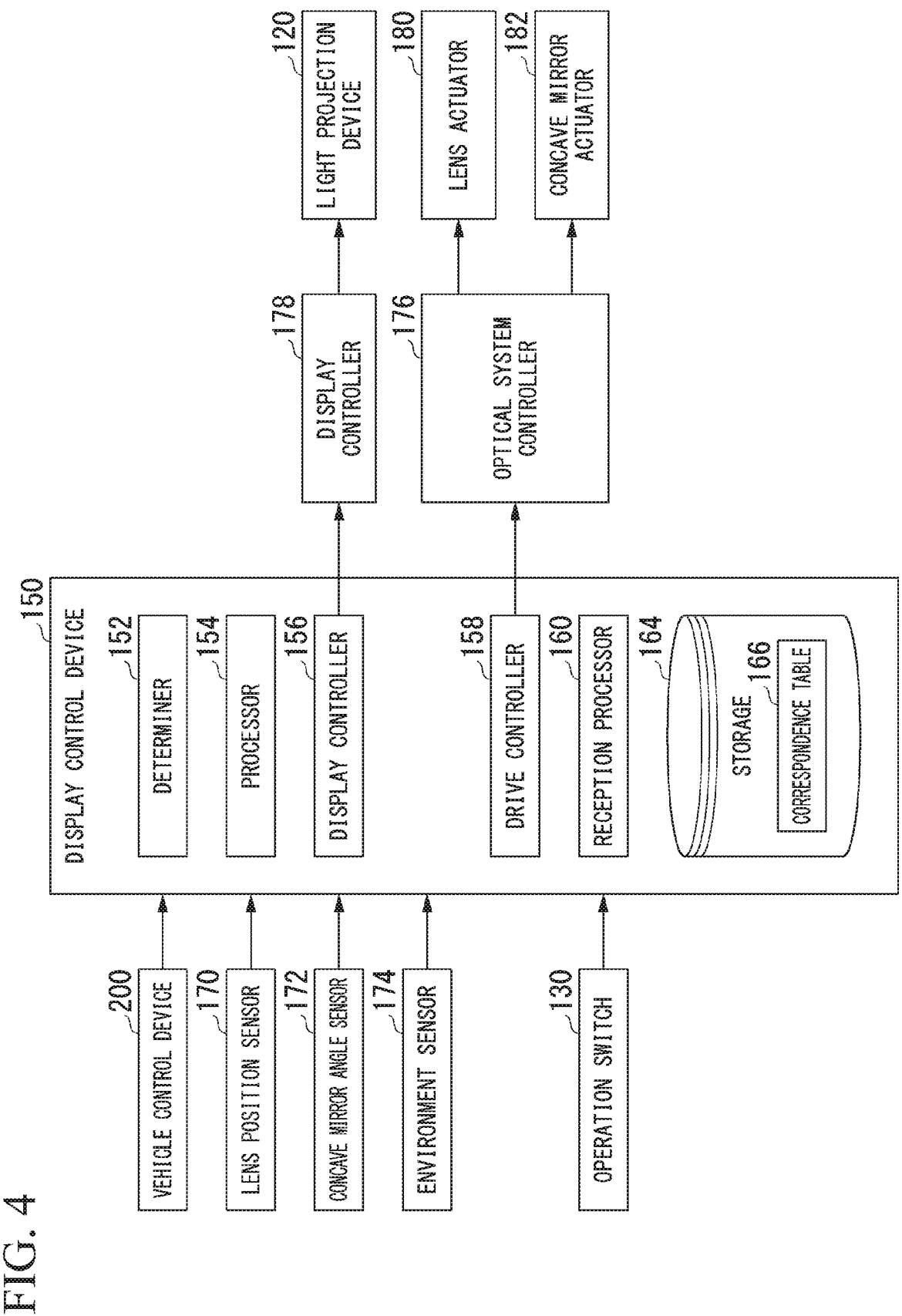
FIG. 4 is a diagram showing an example of a configuration of the display device focusing on a display control device.

The display control device 150 controls display of the virtual image VI visually recognized by the driver. FIG. 4 is a diagram showing an example of a configuration of the display device 100 focusing on the display control device 150. The example of FIG. 4 shows a lens position sensor 170, a concave mirror angle sensor 172, an environment sensor 174, an optical system controller 176, a display controller 178, a lens actuator (an example of a first actuator) 180, a concave mirror actuator (an example of a second actuator) 182, and the light projection device 120 included in the display device 100 in addition to the display control device 150.

The lens position sensor 170 detects positions of one or more lenses included in the optical mechanism 122. The concave mirror angle sensor 172 detects a rotation angle of the concave mirror 126 on the Y axis shown in FIG. 3. The environment sensor 174 detects, for example, the temperatures of the light projection device 120 and the optical mechanism 122. The environment sensor 174 may detect illumination around the vehicle M, detect the speed and steering angle of the vehicle M or detect objects (e.g., obstacles such as other vehicles and pedestrians) around the vehicle M.

The optical system controller 176 drives the lens actuator 180 on the basis of a control signal output from a drive controller 158 to adjust the virtual image visual recognition distance D. The optical system controller 176 drives the concave mirror actuator 182 on the basis of a control signal output from the drive controller 158 to adjust a rotation angle of the concave mirror 126.

The display controller 178 controls details and a display state of an image output from the light projection device 120 on the basis of an instruction of the display control device 150. For example, an image display state is a control quantity or the like associated with control according to a display position among a luminance, the display position, the size and the depression angle θ.

The lens actuator 180 acquires a driving signal output from the optical system controller 176 and moves the positions of one or more lenses included in the optical mechanism 122 by driving a motor or the like on the basis of the acquired driving signal. Accordingly, the virtual image visual recognition distance D is adjusted.

The concave mirror actuator 182 acquires a driving signal output from the optical system controller 176 and rotates the concave mirror actuator 182 on the Y axis by driving a motor or the like on the basis of the acquired driving signal to adjust the reflection angle φ of the concave mirror 126. Accordingly, the depression angle θ is adjusted.

In the present embodiment, a visible light transmission state (e.g., a display position of an original image in the display element 120B) in the light projection device 120 and the rotation angle of the concave mirror 126 determine an appearance of the virtual image VI visually recognized by the driver. For example, the depression angle θ of the virtual image VI changes when at least one of the visible light transmission state in the light projection device 120 and the rotation angle of the concave mirror 126 changes.

For example, the display control device 150 includes a determiner 152, a processor 154, a display controller 156, a drive controller 158, a reception processor 160 and a storage 164. Each of these components is implemented by a hardware processor such as a central processing unit (CPU) executing a program (software). Some or all of these components may be implemented by hardware (a circuit; including circuitry) such as a large scale integration (LSI) circuit, an application specific integrated circuit (ASIC), a field-programmable gate array (FPGA), or a graphics processing unit (GPU) or implemented by software and hardware in cooperation. The program may be stored in a storage device (not shown) such as an HDD or a flash memory of the display control device 150 in advance or stored in a detachable storage medium such as a DVD or a CD-ROM and installed in an HDD or a flash memory of the display control device 150 when the storage medium is inserted into a drive device.

For example, the storage 164 is realized by a storage device such as a random access memory (RAM), a read only memory (ROM), a hard disk drive (HDD) or a flash memory. For example, a correspondence table 166 is stored in the storage 164. The correspondence table 166 is information in which images are associated with events. Images are provided by the display device 100 to occupants.

The event is an event that occurs due to a state of the vehicle. For example, the event of the first type is necessity for a check related to a predetermined function or a generation of a warning, such as necessity of a check of brakes, necessity of checking an engine, a fact that the distance to a preceding vehicle becomes a threshold value or less, and necessity checking the ACC, LKAS or CMBS.

For example, events include a headlight having been set to a high beam, ACC, LKAS or CMBS having been set in an on state, door lock having not been set, a door having not been completely closed, a fog lamp having been turned on, an incoming call having been received through a telephone function provided in the vehicle, approaching of a timing for turning right or left in order to reach a destination set in a navigation device, approaching a branch toward the destination, a timing indicating an outdoor temperature set in advance, drowsiness having been detected by a drowsiness detection device mounted in the vehicle, and the like.

Events may be a driving source having been controlled (or being controlled) to be in an on state, a vehicle having been controlled (or being controlled) to be an accessary on state, and various additional events with respect to a vehicle.

Although an example in which the position of a displayed image is controlled in response to events will be described below, the image whose position is controlled may be an image regularly displayed by the display 110.

The determiner 152 determines whether an operation of setting the display device 100 in an on state has been performed. The determiner 152 determines whether a driving source of the vehicle has been controlled to be in an on state or whether an event set in advance has occurred on the basis of information acquired from a vehicle control device 200.

The processor 154 identifies event types and images associated with event types with reference to the correspondence table 166.

The display controller 156 causes the display 110 to output an image associated with an event at a predetermined event occurrence timing. The display controller 156 controls a depression angle θ of a position at which an image is visually recognized by a viewer according to an operation performed for the adjustment switch 134 or the adjustment switch 136. Details of the process of the display controller 156 will be described later.

The drive controller 158 generates a control signal (a first control signal) for moving the positions of one or more lenses included in the optical mechanism 122 and a control signal (a second control signal) for adjusting the rotation angle of the concave mirror 126 on the basis of control information provided by the display controller 156 and outputs the generated control signals to the optical system controller 176. The drive controller 158 generates the first control signal or the second control signal such that the virtual image VI including an image is visually recognized at a position indicated by the display controller 156 or the virtual image VI including the image is visually recognized at the virtual image visual recognition distance D on the basis of a lens position detected by the lens position sensor 170 and the reflection angle φ of the concave mirror 126 detected by the concave mirror angle sensor 172 and outputs the generated control signal to the optical system controller 176. For example, the drive controller 158 controls the optical mechanism 122 such that the virtual image visual recognition distance D increases as the speed of the vehicle increases. For example, the drive controller 158 controls the light projection device 120 and the concave mirror 126 such that the depression angle θ decreases as the virtual image visual recognition distance D increases. Accordingly, it is possible to prevent a phenomenon in which the virtual image VI is viewed at a deep position below a road surface (sinking) and form the virtual image VI perceived through the line of sight of the driver. As a result, visibility can be improved.

The drive controller 158 adjusts the position of the virtual image VI or the virtual image visual recognition distance D on the basis of details of an operation received through the operation switch 130. For example, the drive controller 158 outputs a first control signal for moving the position of the virtual image VI upward within the displayable area A1 to the optical system controller 176 when an operation of the adjustment switch 134 has been received. The drive controller 158 outputs a first control signal for moving the position of the virtual image VI downward within the displayable area A1 to the optical system controller 176 when an operation of the adjustment switch 136 has been received.

The reception processor 160 receives an instruction performed with respect to the operation switch 130.

The vehicle control device 200 controls the vehicle or acquires detection results of various sensors mounted in the vehicle. For example, the vehicle control device 200 executes a driving assistance function of assisting a driver of the vehicle M with driving. When the driving assistance function is executed, the vehicle M performs one or both of steering control and speed control without depending on an operation of a driving operator (e.g., the steering wheel 10, an accelerator pedal, or a brake pedal) performed by the driver, for example. When the ACC is executed as a driving assistance function, for example, the vehicle control device 200 performs acceleration/deceleration control (speed control) based on the distance between the vehicle M and a preceding vehicle such that the vehicle travels in a state in which the distance between the vehicle and the preceding vehicle is kept constant on the basis of information input through an object recognition device (not shown) mounted in the vehicle M. In addition, when the LKAS is executed as a driving assistance function, the vehicle control device 200 performs steering control such that the vehicle M travels while keeping a lane in which the vehicle M is currently traveling (lane keep). When the CMBS is executed as a driving assistance function, the vehicle control device 200 performs deceleration control or stop control of the vehicle M when the distance between the vehicle M and a preceding vehicle has become less than a predetermined distance. For example, the vehicle control device 200 outputs a state of the driving assistance function to the display control device 150. The vehicle control device 200 outputs information (warning information) for warning the driver before the LKAS or the CMBS is executed to the display control device 150. The warning information is a lane deviation warning, a preceding vehicle approach warning, or the like, for example.

[Adjustment of Position of Image]

The display controller 156 controls the depression angle θ on the basis of an operation of an occupant. The display controller 156 selects any of patterns of the depression angle θ of finite numbers, for example, depending on an operation performed by an occupant. Hereinafter, patterns of this depression angle θ are referred to as control modes. Each control mode is a mode in which the position of the depression angle θ has been set with respect to the virtual image visual recognition distance D.

For example, when an occupant operates the main switch 132 in a state in which the vehicle has stopped, a virtual image generated by the display 110 is displayed. In this state, when the occupant operates the adjustment switch 134 or 136, the depression angle θ in a minimum distance Dmin is adjusted and a control mode associated with the depression angle θ in the minimum distance Dmin is set.

Figure 5:
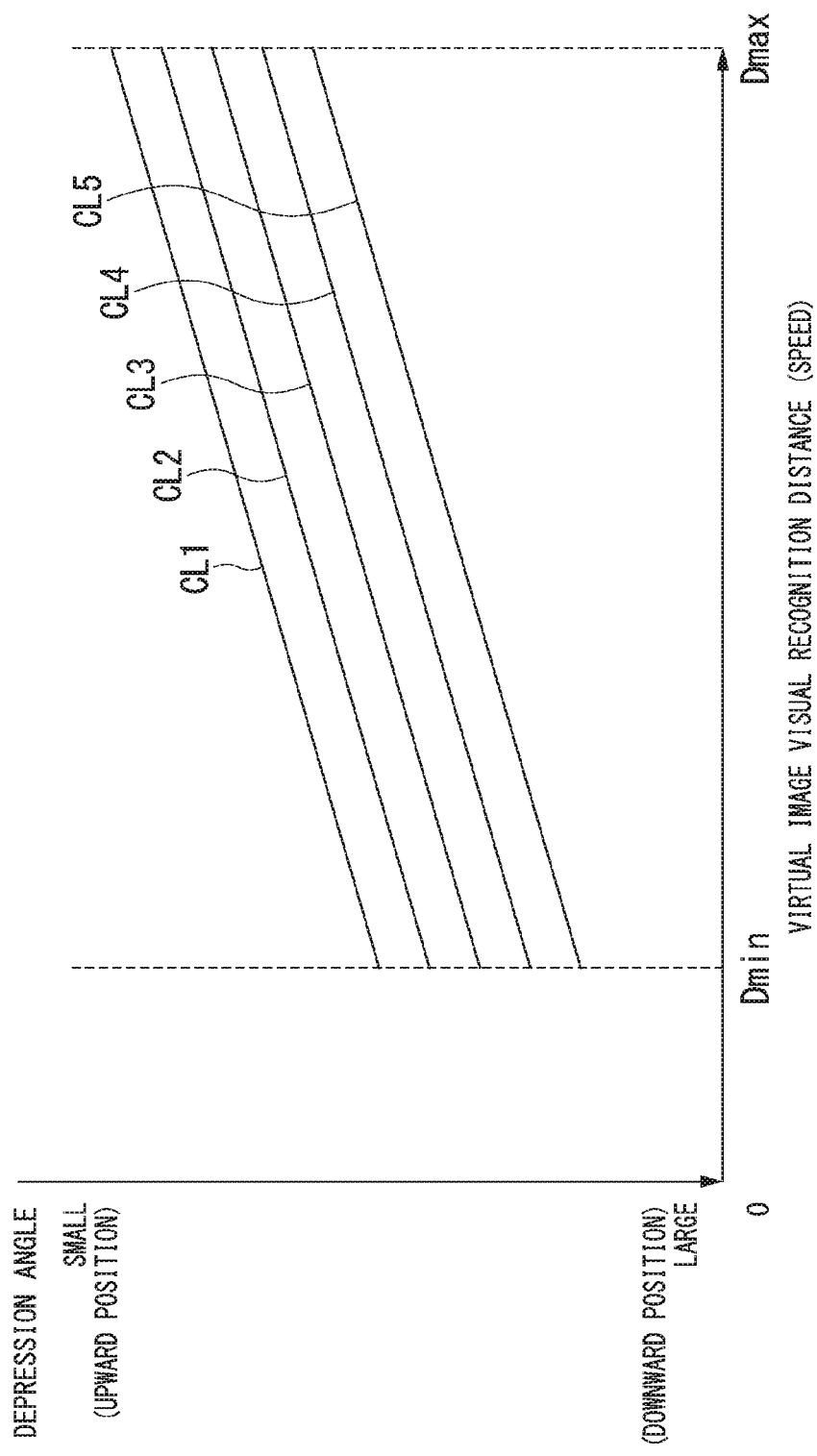
FIG. 5 is a diagram showing an example of details of control modes.

FIG. 5 is a diagram showing an example of details of the control modes. The vertical axis of FIG. 5 shows the depression angle θ and the horizontal axis of FIG. 5 shows the virtual image visual recognition distance D. For example, control modes 1 to 5 associated with patterns of the depression angle θ of finite numbers associated with the minimum distance Dmin are present in the example of FIG. 5. With respect to the control modes 1 to 5, control tendencies are indicated by control lines CL1 to CL5 shown in FIG. 5. Each control line is set such that the depression angle θ decreases (viewed as more upper when viewed from the occupant) as the virtual image visual recognition distance D increases. Inclinations of the control lines CL1 to CL5 may be set to be the same or may be different according to control modes. The minimum distance Dmin is an example of a predetermined distance.

Figure 6:
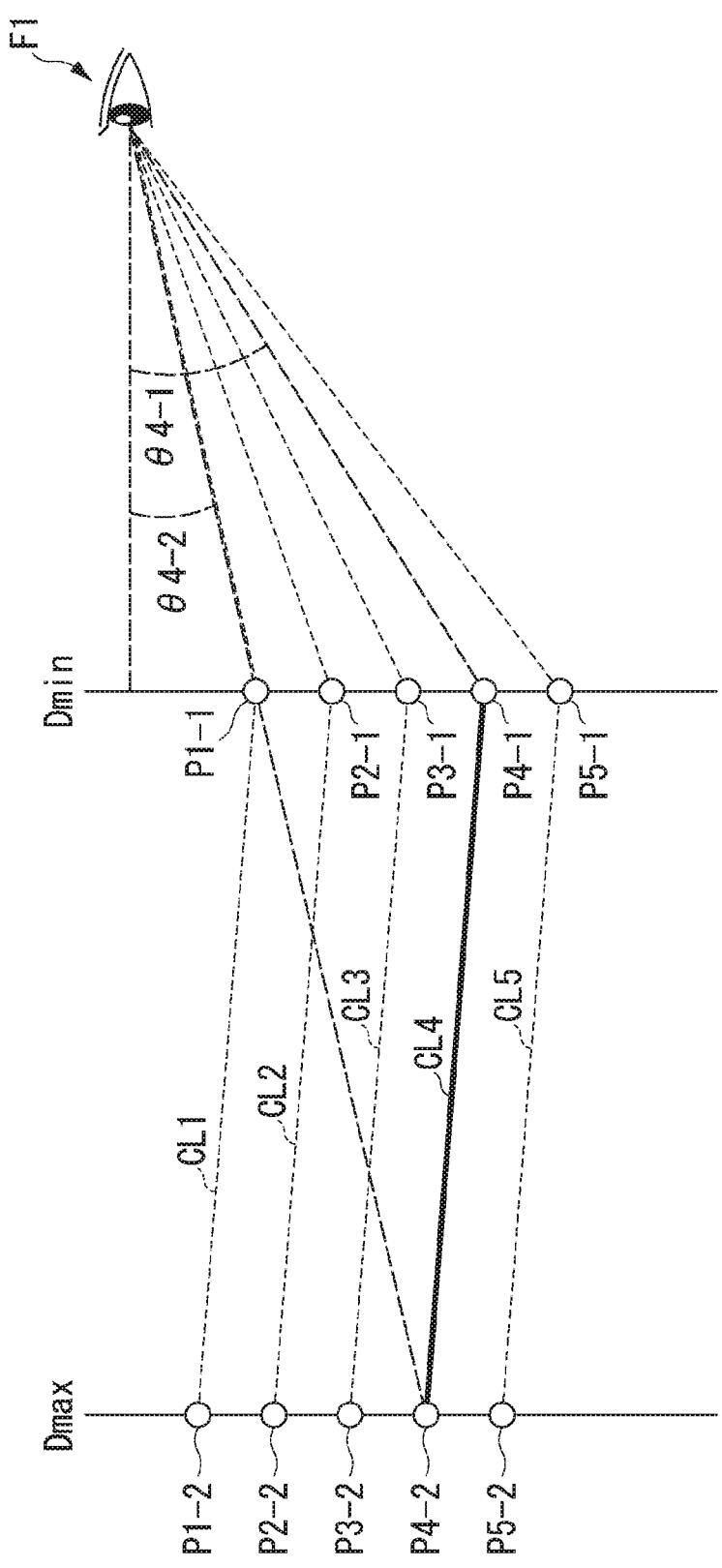
FIG. 6 is a diagram conceptually showing a depression angle of an image viewed by an occupant.

FIG. 6 is a diagram schematically showing a depression angle of an image viewed by an occupant. Here, it is assumed that the control mode 4 is set and an image is displayed on the basis of the control line CL4. In this case, the image is displayed at a position P4-1 at the minimum distance Dmin and a depression angle at this time is a depression angle θ4-1. The image is displayed at a position P4-2 at a maximum distance Dmax and a depression angle at this time is a depression angle θ4-2.

Figure 7:
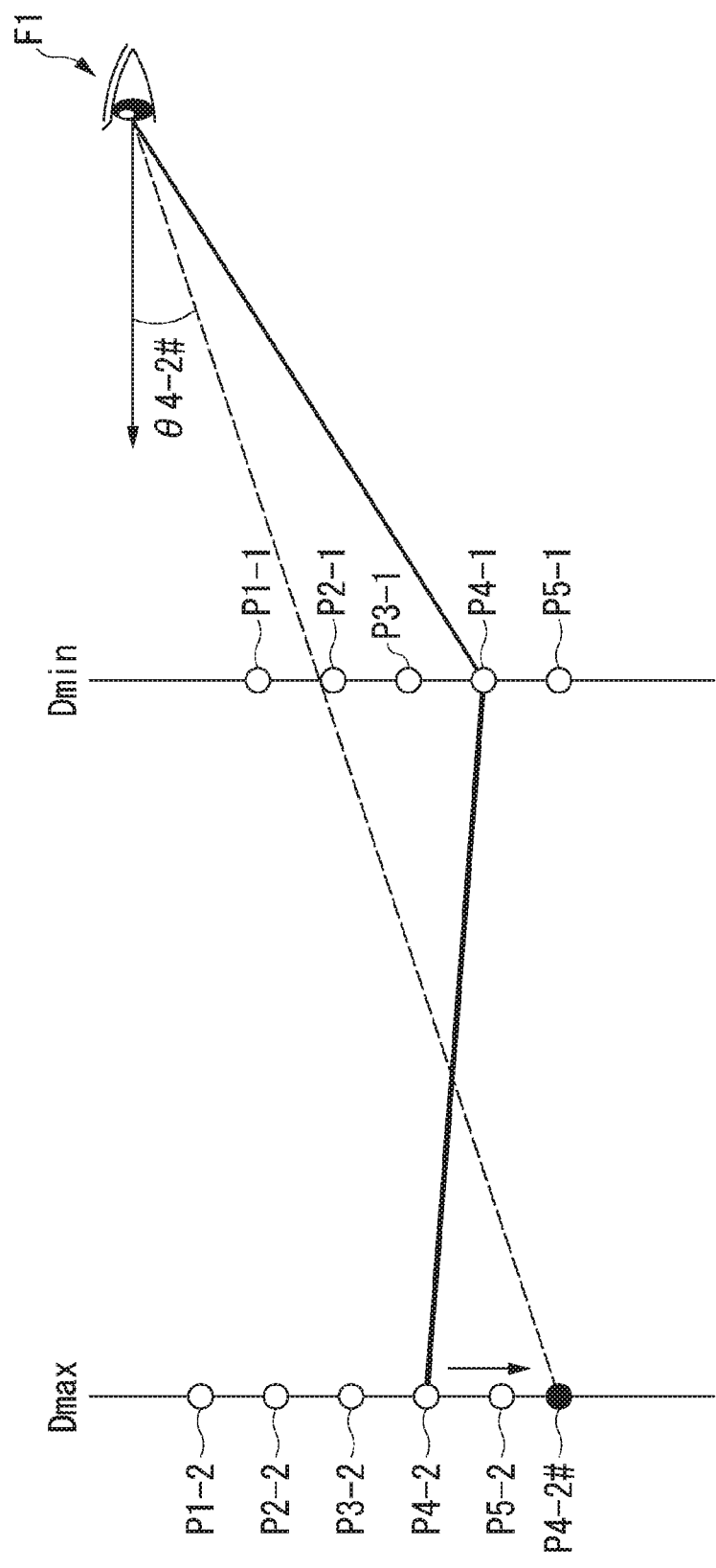
FIG. 7 is a diagram showing a state in which a position of an image at a longest distance has been changed to P4-2 # according to an operation of an occupant.

FIG. 7 is a diagram showing a state in which the position of the image at the maximum distance Dmax has been changed from the position P4-2 to a position P4-2 # through an operation of the occupant in a situation in which the virtual image visible distance D is the maximum distance Dmax. In this case, the display controller 156 sets an adjusted depression angle θ4-2 # that has been adjusted through an operation of the occupant as a minimum depression angle and causes the display 110 to generate an image such that the depression angle θ does not become less than the set minimum depression angle θ4-2 # irrespective of the virtual image visual recognition distance D. The maximum distance Dmax of FIG. 7 is an example of a "first virtual image visual recognition distance," the depression angle θ associated with the position P4-2 of FIG. 7 is an example of a "first depression angle," and the depression angle θ associated with the position P4-2 # of FIG. 7 is an example of a "second depression angle."

Figure 8:
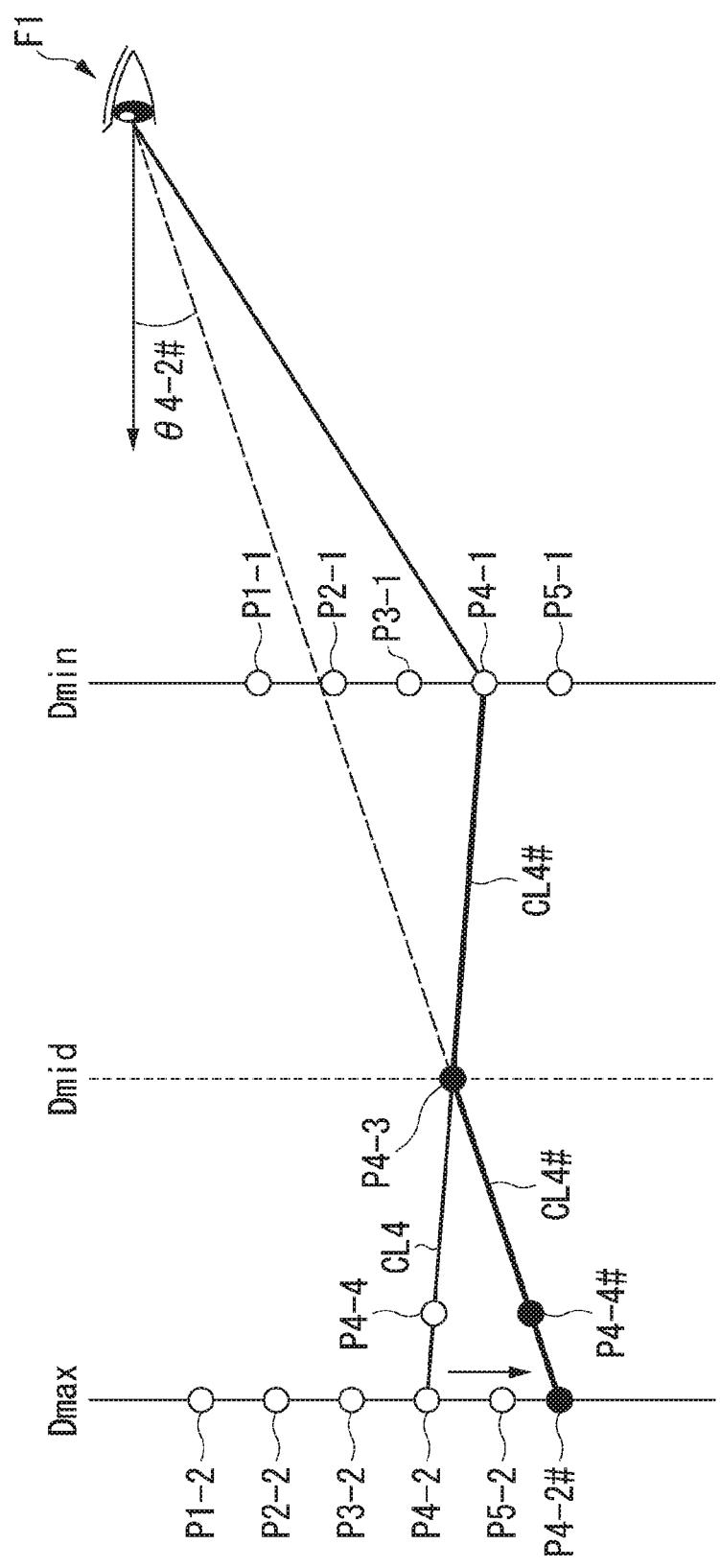
FIG. 8 is a diagram showing control of a depression angle.

Specifically, the depression angle θ is controlled as described below. FIG. 8 is a diagram showing control of the depression angle. The display controller 156 changes the control line CL4 to a control line CL4 #. The control line CL4 # is a control line by which a depression angle θ at a distance equal to or greater than a medium distance Dmid is limited having the minimum depression angle θ4-2 # as a lower limit. The medium distance Dmid is a distance associated with a position P4-3 at which the control line CL4 intersects a control line CL4 # associated with the depression angle θ4-2 #. Positions P4-4 and P4-4 # in the figure will be described later in FIG. 11.

The depression angle θ of the position of the image becomes less than a minimum depression angle between the virtual image visual recognition distance Dmax to the medium distance Dmid if the minimum depression angle is not set, whereas the depression angle θ is controlled not to be less than the minimum depression angle when the minimum depression angle is set.

Figure 9:
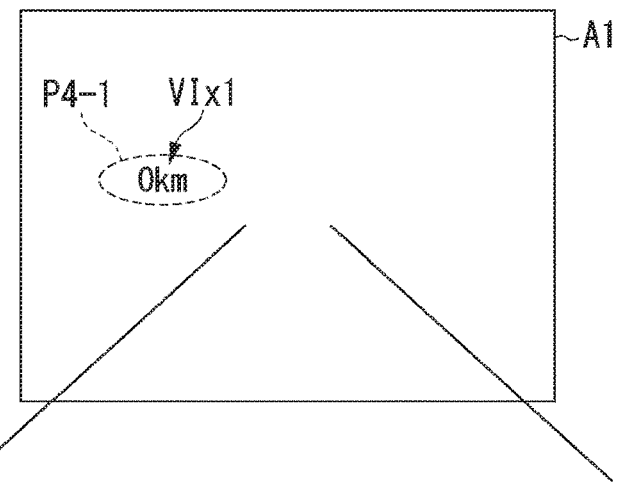
FIG. 9 is a diagram (1) showing an example of an image viewed by an occupant.

An image visually recognized by an occupant when the control described in FIG. 8 has been performed will be described with reference to FIGS. 9 to 11. For example, when the vehicle speed is zero at a time t, an image VIx1 is displayed at the position P4-1, as shown in FIG. 9. When the vehicle speed increases and the virtual image visual recognition distance D increases, an image VIx2 is displayed at the position P4-2 in accordance with the control line CL4 before change.

Figure 10:
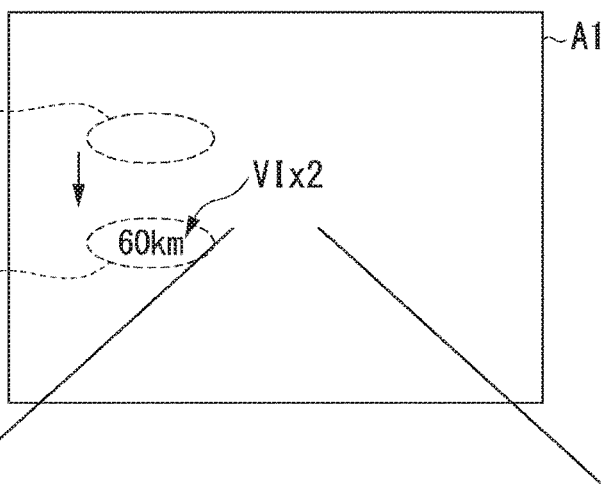
FIG. 10 is a diagram (2) showing an example of an image viewed by an occupant.

For example, when the occupant performs an operation for increasing the depression angle θ on the adjustment switch 136 in a state in which the image Vix2 is displayed at the position P4-2 at a time t+1, the image VIx2 is displayed at the position P4-2 #, as shown in FIG. 10.

Figure 11:
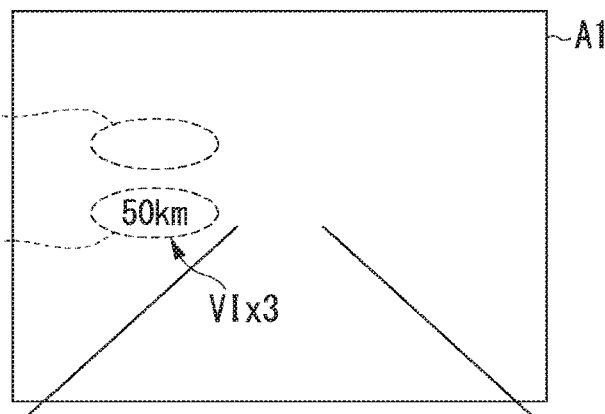
FIG. 11 is a diagram (3) showing an example of an image viewed by an occupant.

For example, when the vehicle speed has decreased from the vehicle speed at the time t+1 at a time t+2, the virtual image visual recognition distance D decreases from the virtual image visual recognition distance D at the time t+1 and an image VIx3 is displayed at a position P4-4 #, as shown in FIG. 11. A depression angle θ4-2 # of the position P4-4 # is greater than the depression angle θ of the position P4-4 based on the control line CL4 (refer to FIG. 8).

As described above, when an image has been displayed at the virtual image visual recognition distance D different from the minimum distance Dmin, if the occupant performs an operation of adjusting the depression angle θ, the display controller 156 sets the adjusted depression angle θ as a minimum depression angle and thus information can be provided in a display state suited for preferences of the occupant. For example, an image is displayed lower than a position at which the image is displayed on the basis of control information between the medium distance Dmid and the maximum distance Dmax. For example, when the occupant thinks that image display is annoying and thus adjusts the depression angle θ, annoyance can be reduced.

[Flowchart]

Figure 12:
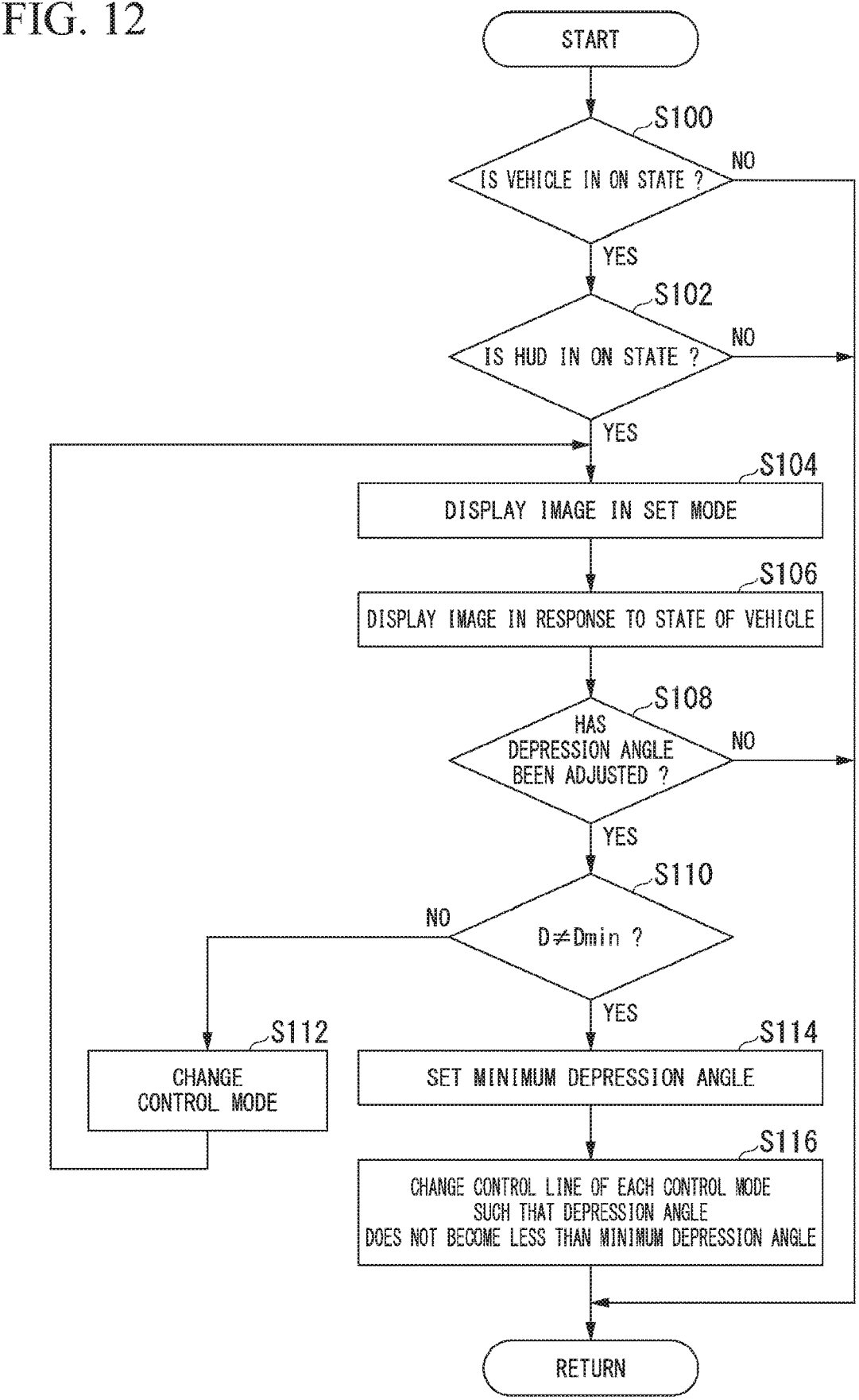
FIG. 12 is a flowchart showing an example of a flow of processes performed by a display control device.

FIG. 12 is a flowchart showing an example of a flow of processes performed by the display control device 150. First, the display controller 156 determines whether an operation for setting the display device 100 in an on state has been performed (step S100). When the operation for setting the display device 100 in an on state has been performed, the display controller 156 determines whether an operation for setting the display 110 in an on state have been performed (step S102).

Next, the display controller 156 displays an image on the basis of a control mode set in advance (step S104). Subsequently, the display controller 156 displays an image in response to a state of the vehicle (step S106). Then, the display controller 156 determines whether the depression angle θ has been adjusted at the virtual image visual recognition distance D different from the minimum distance Dmin (step S108).

When the depression angle θ has been adjusted, the display controller 156 determines whether the virtual image visual recognition distance D when the depression angle θ has been adjusted is not the minimum distance Dmin (step S110). If the virtual image visual recognition distance D when the depression angle θ has been adjusted is the minimum distance Dmin, the display controller 156 changes the control mode on the basis of the adjusted angle θ (step S112). For example, when the depression angle θ has been adjusted from a depression angle θ set on the control line CL4 to a depression angle θ set on the control line CL3, the control mode is changed from the control mode 4 to the control mode 3.

If the virtual image visual recognition distance D when the depression angle θ has been adjusted is not the minimum distance Dmin, the display controller 156 sets a minimum depression angle on the basis of the adjusted depression angle θ (step S114). Next, the display controller 156 changes the control line of the control mode such that the depression angle θ does not become less than the minimum depression angle (step S116). Accordingly, processes of one routine of this flowchart end.

When negative determination has been performed in step S100, S102 or S108, processes of one routine of this flowchart end.

According to the above-described processes, information can be provided in a display state suited for preferences of the occupant.

The minimum depression angle set through the above-described process may be associated with the occupant and stored in the storage 164 as minimum depression angle information. In this case, when the occupant controls the display 110 to be in an on state after a process of displaying an image ends and output of the display 110 is set to an off state, the display controller 156 may control the depression angle θ on the basis of the minimum depression angle information (changed control line).

Figure 13:
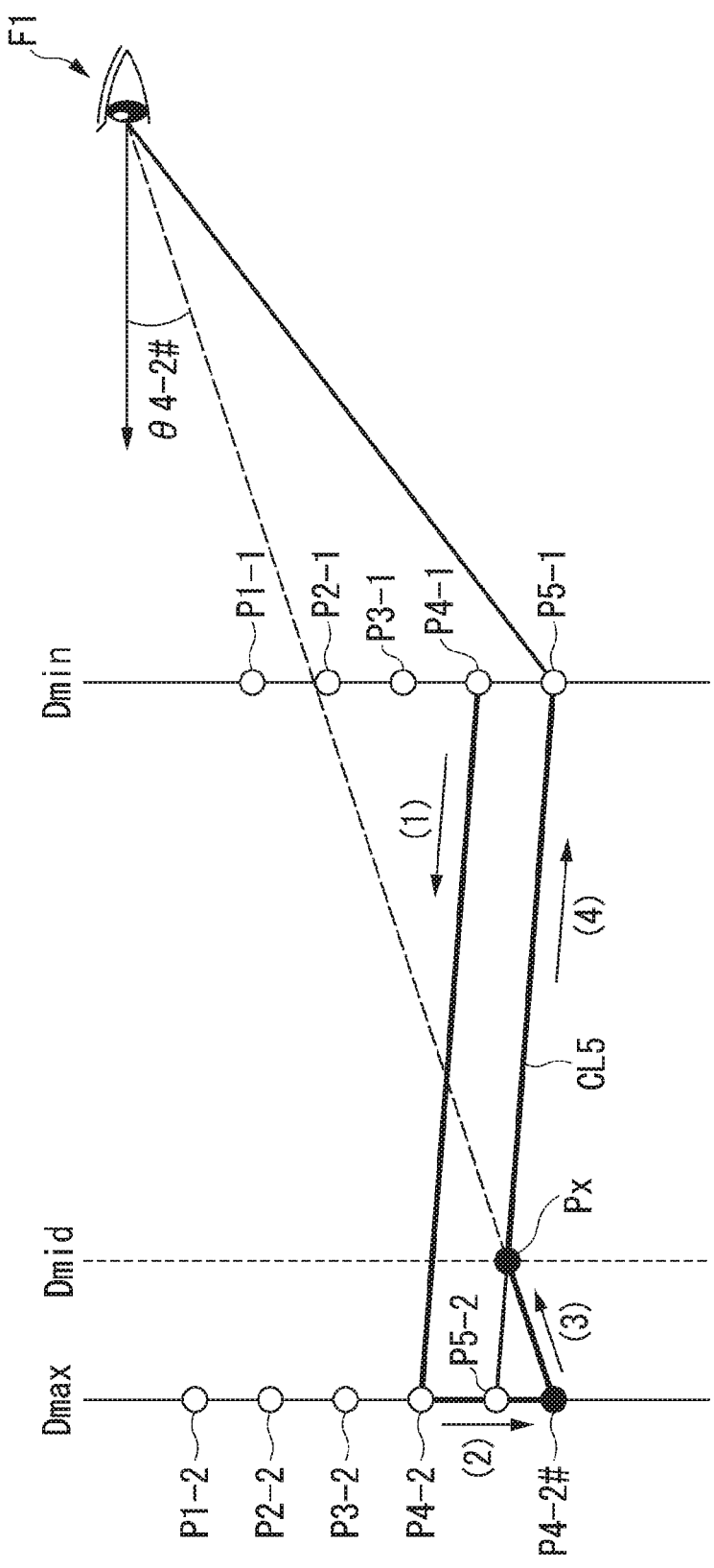
FIG. 13 is a diagram showing another example of a medium distance.

Although it is assumed that the medium distance Dmid is a distance associated with the position P4-3 at which the control line CL4 intersects the control line CL4 #, as shown in FIG. 8, in the above-described embodiment, the medium distance Dmid may be a distance associated with a position Px at which a control line CL4 # among the control lines CL1 to CL5 intersects a control line that initially intersects the control line CL4 #. FIG. 13 is a diagram showing another example of the medium distance Dmid. For example, when the medium distance Dmid is set as shown in FIG. 13, the depression angle θ is controlled in the order of (1) to (4) of FIG. 13.

The medium distance Dmid may be a distance associated with a position at which the control line CL4 # among the control lines CL1 to CL5 intersects an N-th control line intersecting the control line CL4 #. "N" is any natural number. The medium distance Dmid may be a distance associated with a position at which the control line CL4 # intersects a control line. The control line is include in the control lines CL1 to CL5. The control line is line intersecting the control line CL4 # immediately before a control line of a control mode set in advance. Control lines may be non-linear instead of being linear.

[Range in which Depression Angle is Adjusted after Setting of Minimum Depression Angle]

When the display controller 156 has controlled the depression angle θ on the basis of the control line CL4 #, the display controller 156 receives adjustment of the depression angle according to an operation of the occupant within a range in which the depression angle θ does not become less than the minimum depression angle at the minimum distance Dmin, for example.

Figure 14:
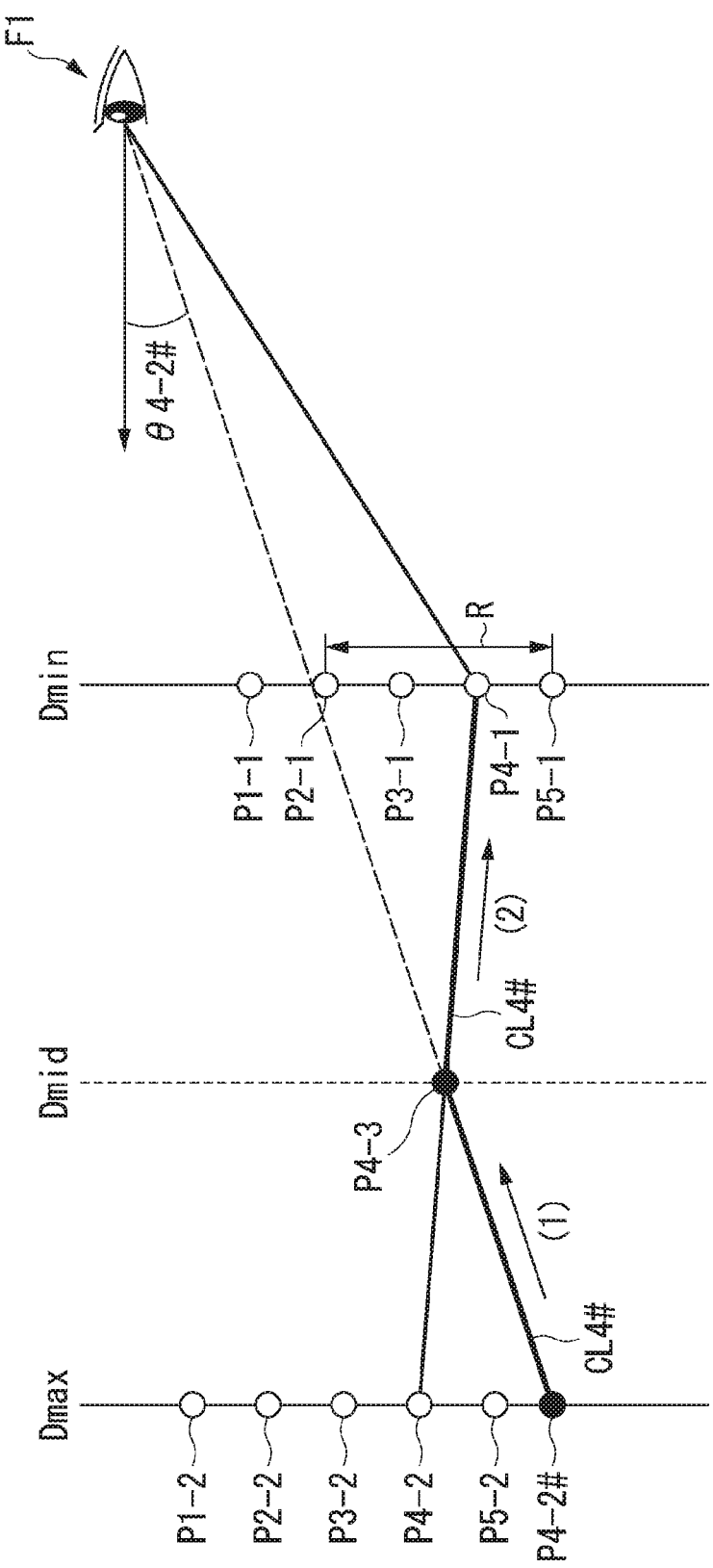
FIG. 14 is a diagram showing an example of a range in which adjustment of a depression angle is received.

FIG. 14 is a diagram showing an example of a range R in which depression angle adjustment is received. For example, when an operation of adjusting the depression angle θ is performed within the range R of positions P2-1 to P5-1 in which the depression angle θ becomes greater than a minimum depression angle θ4-2 #, the display controller 156 performs adjustment of the depression angle θ in accordance with the operation. For example, when an operation of the depression angle θ is performed to adjust the position to the position P1-1 at which the depression angle θ becomes less than the minimum depression angle θ4-2 #, the display controller 156 negates the operation and limits adjustment of the depression angle θ within the range R. (1) and (2) of FIG. 14 show the order of change of the depression angle θ. (n) of FIGS. 15 to 17 below shows the order of change of the depression angle θ ("n" is any of (1) to (5)).

In place of the above-described control, when an operation for adjusting the depression angle θ to the position P1-1 at which the depression angle θ becomes less than the minimum depression angle θ4-2 # is performed, for example, the display controller 156 may cancel setting of the minimum depression angle and perform adjustment of the depression angle θ according to the operation.

[Process when Depression Angle has been Adjusted after Setting of Minimum Depression Angle (1-1)]

A case in which an operation of adjusting the depression angle θ at the virtual image visual recognition distance Dmin from the depression angle θ associated with the position P4-1 to the depression angle θ associated with a position P2-1 when the depression angle θ has been controlled on the basis of the control line CL4 # is performed will be described.

Figure 15:
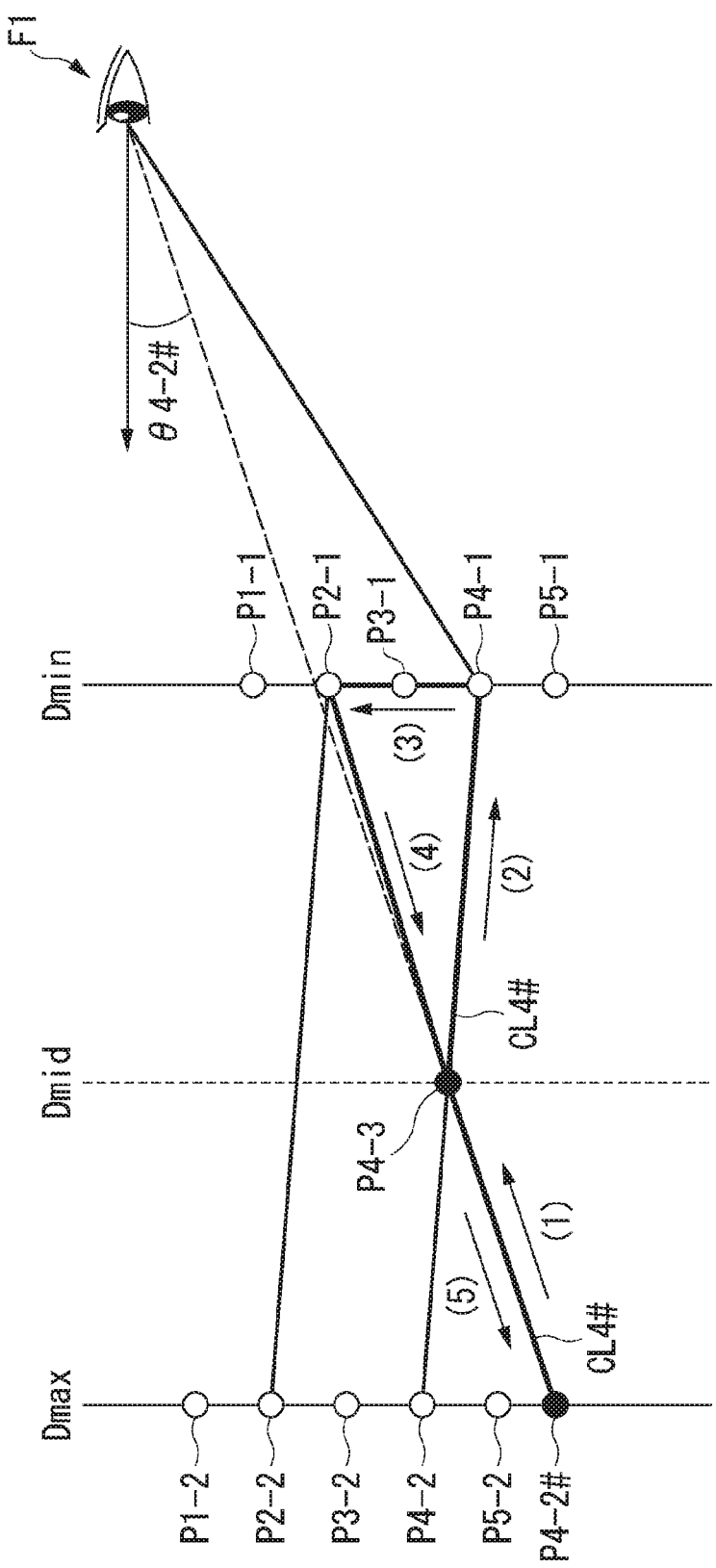
FIG. 15 is a diagram (1-1) showing control of a depression angle θ when the depression angle θ has been changed to a position P2-1 according to an operation of an occupant.

FIG. 15 is a diagram (1-1) showing control of the depression angle θ when the depression angle θ has been changed to the position P2-1 according to an operation of the occupant. In this case, the display controller 156 displays an image at the position of the minimum depression angle θ4-2 between the minimum distance Dmin and the maximum distance Dmax.

[Process when Depression Angle has been Adjusted after Setting of Minimum Depression Angle (1-2)]

Figure 16:
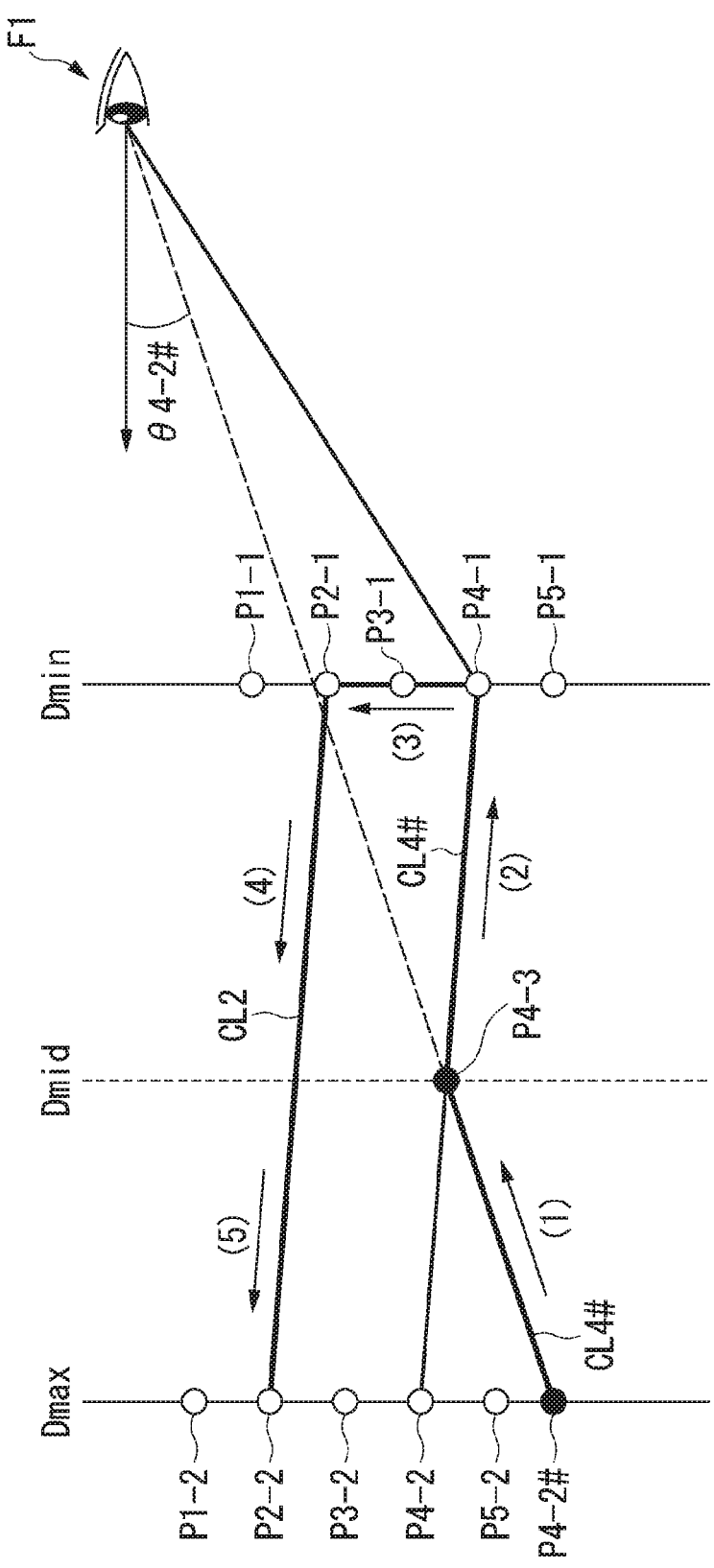
FIG. 16 is a diagram (1-2) showing control of the depression angle θ when the depression angle θ has been changed to the position P2-1 according to an operation of an occupant.

FIG. 16 is a diagram (1-2) showing control of the depression angle θ when the depression angle θ has been changed to the position P2-1 according to an operation of the occupant. In this case, the display controller 156 may display an image on the basis of the depression angle θ set on the control line CL2 associated with the position P2-1 between the minimum distance Dmin and the maximum distance Dmax.

[Process when Depression Angle has been Adjusted after Setting of Minimum Depression Angle (2)]

A case in which an operation of adjusting the depression angle θ at the virtual image visual recognition distance Dmin from the depression angle θ associated with the position P4-1 to the depression angle θ associated with a position P5-1 when the depression angle θ has been controlled on the basis of the control line CL4 # is performed will be described.

Figure 17:
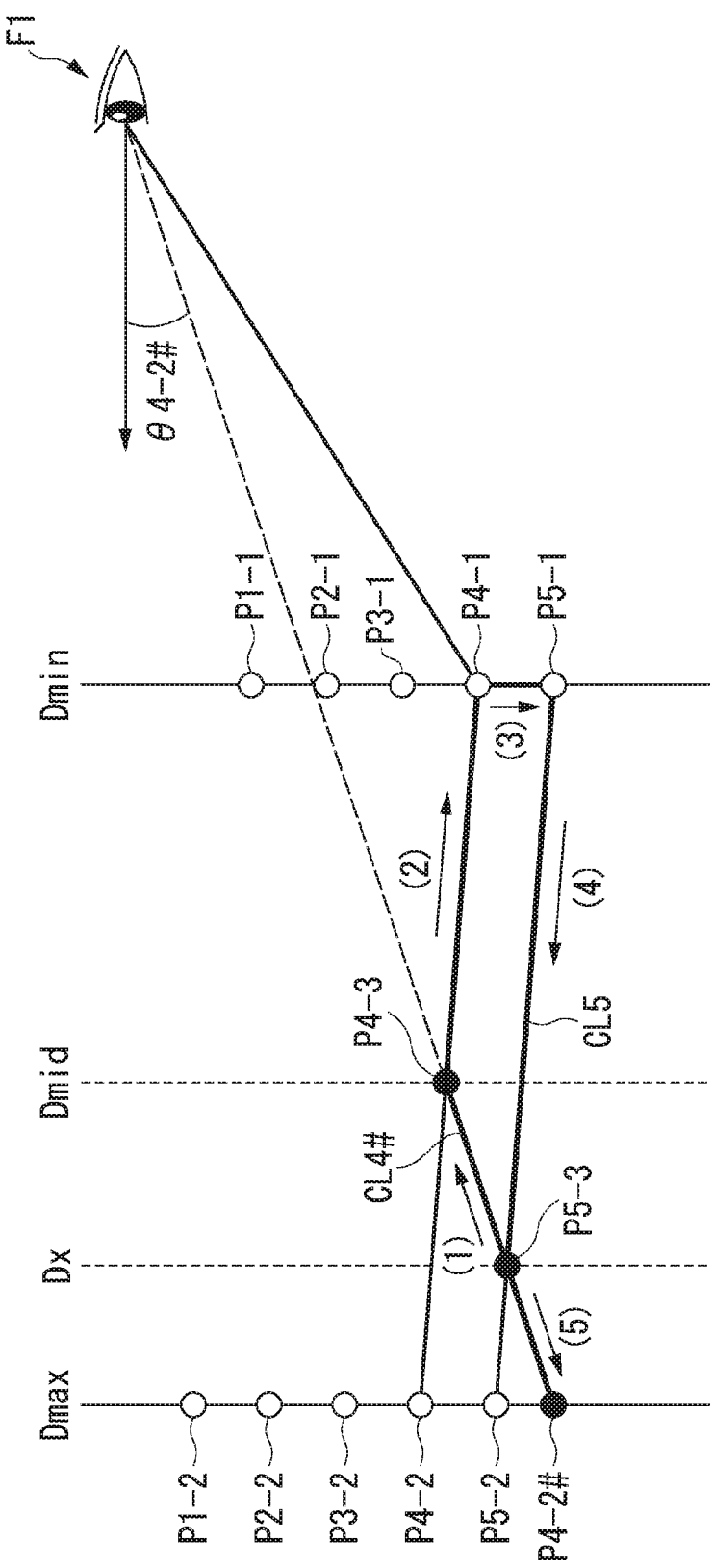
FIG. 17 is a diagram showing control of a depression angle when the depression angle has been changed to a position P5-1 according to an operation of an occupant.

FIG. 17 is a diagram showing control of the depression angle when the depression angle has been changed to the position P5-1 according to an operation of the occupant. In this case, the display controller 156 displays an image on the basis of the depression angle θ set on the control line CL5 between the minimum distance Dmin and a virtual image visual recognition distance Dx and displays an image at the position of the minimum depression angle θ4-2 # between the virtual image visual recognition distance Dx and the maximum distance Dmax. The virtual image visual recognition distance Dx is a virtual image visual recognition distance D in which the depression angle θ set on the control line CL5 becomes less than the minimum depression angle.

According to the above-described first embodiment, when the virtual image visual recognition distance D is not a predetermine distance, the display controller 156 sets the adjusted depression angle θ as a minimum depression angle when the depression angle θ has been adjusted on the basis of a reception result of the operation switch 130 and causes the display 110 to generate an image such that the depression angle θ does not become less than the set minimum depression angle, and thus information can be provided in a display state suited for preferences of an occupant.

Second Embodiment

A second embodiment will be described. In the second embodiment, the display controller 156 determines whether to continue a process of controlling the depression angle θ such that the depression angle θ does not become less than the set minimum depression angle on the basis of selection of an occupant. Hereinafter, a description will be made focusing on differences from the first embodiment.

The display device 100 includes a maintaining switch 138 that receives whether to cause the display 110 to generate an image such that the depression angle θ does not become less than a set minimum depression angle in a case in which the display 110 is caused to end the process of generating an image and then caused to start the process of generating an image again after the depression angle θ is set as the minimum depression angle.

Figure 18:
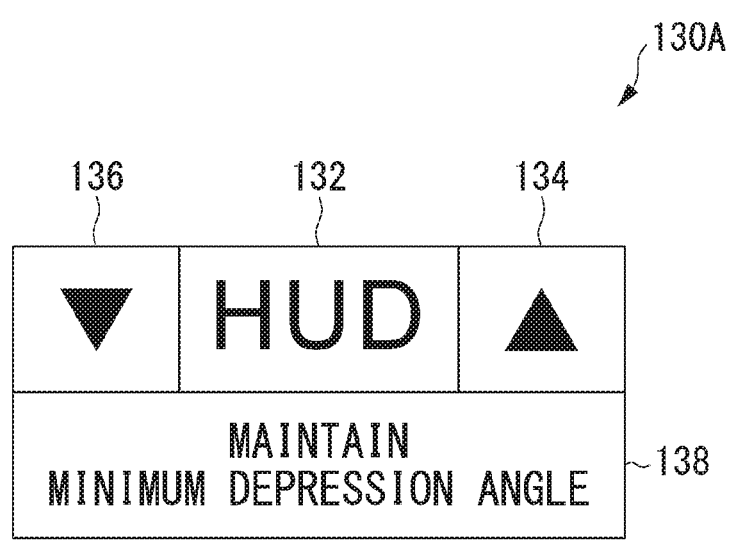
FIG. 18 is a diagram showing an example of an operation switch.

An operation switch 130A includes a main switch 132, an adjustment switch 134, an adjustment switch 136 and the aforementioned maintaining switch 138, for example. FIG. 18 is a diagram showing an example of the operation switch 130A.

When an instruction is received through the maintaining switch 138, The instruction is to cause the display 110 to generate an image such that the depression angle θ does not become less than a set minimum depression angle, the display controller 156 causes the display 110 to generate an image such that the depression angle θ does not become less than the set minimum depression angle in a case in which the display 110 is caused to end the process of generating an image and then caused to start the process of generating an image again after the depression angle θ is set as the minimum depression angle. That is, when the display controller 156 causes the display 110 to start the process of generating an image again, the display controller 156 resets the set minimum depression angle and determines whether to perform control on the basis of a control mode set in advance on the basis of an operation performed on the maintaining switch 138.

"A case in which the display 110 is caused to end the process of generating an image and then caused to start the process of generating an image again" is a case in which the main switch 132 is controlled to be turned off and then controlled to be turned on again.

When the depression angle θ is set as the minimum depression angle and then the virtual image visual recognition distance D is controlled to correspond to the minimum distance Dmin (or a set virtual image visual recognition distance D), the maintaining switch 138 may be a switch that receives information on whether setting of the minimum depression angle is maintained thereafter. In this case, the display controller 156 maintains setting of the minimum depression angle when an operation of maintaining setting of the minimum depression angle has been received through the maintaining switch 138 and resets setting of the minimum depression angle when an operation of maintaining setting of the minimum depression angle has not been received through the maintaining switch 138.

According to the above-described second embodiment, it is possible to provide information in a display state more suited for preferences of an occupant because it is determined whether to maintain setting of a minimum depression angle in response to an intention of the occupant.

According to each of the above-described embodiments, the display device 100 can provide information in a display state suited for preferences of an occupant by including: the display 110 which generates a virtual image overlaid on a landscape and visually recognized by a viewer by outputting light including an image to a reflector that reflects incident light to the eyes of the viewer, the display 110 being able to adjust a virtual image visual recognition distance D from a predetermined position to a position at which the light is formed as the virtual image and a depression angle θ of a position at which the virtual image is visually recognized by the viewer; the operation switch 130 which receives adjustment of the depression angle θ of the position at which the virtual image is visually recognized by the viewer; and the display controller 156 which causes the display 110 to generate a virtual image on the basis of at least a state of a vehicle and adjusts the depression angle θ on the basis of a reception result of the operation switch 130, wherein, when the depression angle θ has been adjusted on the basis of a reception result of the operation switch 130 in a case in which the virtual image visual recognition distance D is not a predetermined distance, the display controller 156 sets the adjusted depression angle θ as a minimum depression angle and causes the display 110 to generate a virtual image such that the depression angle θ does not become less than the set minimum depression angle.

While preferred embodiments of the invention have been described and illustrated above, it should be understood that these are exemplary of the invention and are not to be considered as limiting. Additions, omissions, substitutions, and other modifications can be made without departing from the spirit or scope of the present invention.

What is claimed is:

1. A display device comprising:
   an image generator that generates a virtual image overlaid on a landscape and visually recognized by a viewer by outputting light including an image to a reflector which reflects incident light to the eyes of the viewer and able to adjust a virtual image visual recognition distance from a predetermined position to a position at which the light is formed as the virtual image and a depression angle of a position at which the virtual image is visually recognized by the viewer;
   a first receptor that receives adjustment of the depression angle of the position at which the virtual image is visually recognized by the viewer in response to an operation of the viewer; and
   a controller that causes the image generator to generate a virtual image on the basis of at least a speed of a vehicle and to adjust the depression angle on the basis of a reception result of the first receptor,
   wherein, the controller sets the depression angle based on the speed of the vehicle and a control mode set from among a plurality of control modes, each of the plurality of the control modes defining relation with the depression angle and the virtual image visual recognition distance,
   in a case that the virtual image visual recognition distance varying based on the speed is longer than a reference distance and the first receptor receives the operation of the viewer that increases the depression angle, the controller adjusts the depression angle corresponding to the virtual image visual recognition distance to a depression angle based on a reception result of the first receptor, after adjusting the depression angle corresponding to the virtual image visual recognition distance to a depression angle based on a reception result of the first receptor and in a case that the virtual image visual recognition distance changes and changed virtual image visual recognition distance is in a first section set in distance longer than the reference distance, the controller sets the depression angle, and after adjusting the depression angle corresponding to the virtual image visual recognition distance to a depression angle based on a reception result of the first receptor and in a case that the virtual image visual recognition distance changes and changed virtual image visual recognition distance is in a second section set in distance equal to or shorter than the reference distance, the controller sets the depression angle based on the control mode.

2. The display device according to claim 1, wherein the controller:

causes the image generator to generate the virtual image at a first depression angle at a first virtual image visual recognition distance when the depression angle has been adjusted to a second depression angle greater than the first depression angle on the basis of a reception result of the first receptor and set the adjusted second depression angle as a minimum depression angle, when the minimum depression angle has been set, causes the image generator to generate a virtual image such that the depression angle does not become less than the set minimum depression angle, and when the minimum depression angle has not been set, causes the image generator to generate a virtual image such that the depression angle of the position of the virtual image becomes a depression angle less than the minimum depression angle at a virtual image visual recognition distance different from the first virtual image visual recognition distance.

3. The display device according to claim 1, wherein the state of the vehicle is a speed of the vehicle, and wherein the controller increases the virtual image visual recognition distance as the speed of the vehicle increases.

4. The display device according to claim 1, wherein the predetermined distance is a minimum virtual image visual recognition distance set in advance.

5. The display device according to claim 1, wherein the controller sets the depression angle on the basis of set control information among a plurality of pieces of control information in which a relationship between the virtual image visual recognition distance and the depression angle has been set, and at least the state of the vehicle.

6. The display device according to claim 5, wherein the controller causes the image generator to generate a virtual image without changing the depression angle at a virtual image visual recognition distance equal to or greater than a second virtual image visual recognition distance, and cause the image generator to generate a virtual image on the basis of the control information at a virtual image visual recognition distance less than the second virtual image visual recognition distance, wherein the second virtual image visual recognition distance is a distance associated with a depression angle associated with the set minimum depression angle in the control information.

7. The display device according to claim 5, wherein the controller causes the image generator to generate a virtual image without changing the depression angle when the adjusted depression angle has been set as a minimum depression angle.

8. The display device according to claim 1, wherein, when the depression angle after being adjusted has been set as a minimum depression angle, and the image generator has been caused to end a process of generating the virtual image and then caused to start the process of generating a virtual image again, the controller causes the image generator to generate a virtual image such that the depression angle does not become less than the set minimum depression angle.

9. The display device according to claim 8, further comprising a second receptor that receives information on whether to cause the image generator to generate a virtual image such that the depression angle does not become less than the set minimum depression angle when the image generator is caused to start the process of generating a virtual image again, wherein the controller causes the image generator to generate a virtual image such that the depression angle does not become less than the set minimum depression angle when information on causing the image generator to generate a virtual image such that the depression angle does not become less than the set minimum depression angle is received through the second receptor.

10. The display device according to claim 1, comprising:

a light projection device that outputs the image as light;

an optical mechanism provided on a path of the light and configured to be able to adjust a distance from a predetermined position to a position at which the light is formed as a virtual image;

a concave mirror that reflects light passing through the optical mechanism toward a reflector;

a first actuator that adjusts the position in the optical mechanism; and a second actuator that adjusts a reflection angle of the concave mirror.

11. The display device according to claim 1, comprising:

wherein, in a case that the virtual image visual recognition distance changes and the changed virtual image visual recognition distance is in a second section set in distance equal to or shorter than the reference distance, the controller sets the depression angle based on the control mode that was set before the first receptor receives the operation of the viewer that increases the depression angle.

12. A display control method using a computer, the computer method comprising:

generating a virtual image overlaid on a landscape and visually recognized by a viewer by outputting light including an image to a reflector which reflects incident light to the eyes of the viewer on the basis of at least a speed of a vehicle and able to adjust a virtual image visual recognition distance from a predetermined position to a position at which the light is formed as the virtual image and a depression angle of a position at which the virtual image is visually recognized by the viewer to generate a virtual image;

adjusting the depression angle based on receiving an adjustment of the depression angle of the position at which the virtual image is visually recognized by the viewer in response to an operation of the viewer;

wherein the depression angle is adjusted based on the speed of the vehicle and a control mode set from among a plurality of control modes, each of the plurality of the control modes defining relation with the depression angle and the virtual image visual recognition distance, in a case that the virtual image visual recognition distance varying based on the speed is longer than a reference distance and receiving the adjustment of the viewer that increases the depression angle, adjusting the depression angle corresponding to the virtual image visual recognition distance to a depression angle, after adjusting the depression angle corresponding to the virtual image visual recognition distance to a depression angle based receiving the adjustment and in a case that the virtual image visual recognition distance changes and changed virtual image visual recognition distance is in a first section set in distance longer than the reference distance, setting the depression angle, and after adjusting the depression angle corresponding to the virtual image visual recognition distance to a depression angle based receiving the adjustment and in a case that the virtual image visual recognition distance changes and changed virtual image visual recognition distance is in a second section set in distance equal to or shorter than the reference distance, setting the depression angle based on the control mode.

13. A display device comprising:
a display that generates a virtual image overlaid on a landscape and visually recognized by a viewer by outputting light including an image to a reflector which reflects incident light to the eyes of the viewer and able to adjust a virtual image visual recognition distance from a predetermined position to a position at which the light is formed as the virtual image and a depression angle of a position at which the virtual image is visually recognized by the viewer;
a processor; and
a memory storing executable instructions that, when executed by the processor, perform, comprising;
receiving adjustment of the depression angle of the position at which the virtual image is visually recognized by the viewer in response to an operation of the viewer;

causing the display to generate a virtual image on the basis of at least a speed of a vehicle and to adjust the depression angle base on the adjustment of the depression angle of the position in accordance with the operation of the viewer, setting the depression angle based on the speed of the vehicle and control mode set from among a plurality of control modes, each of the plurality of control modes defining relation with the depression angle and the virtual image visual recognition distance, and in a case that the virtual image visual recognition distance varying based on the speed is longer than a reference distance and receiving an operation of the viewer that increases the depression angle, adjusting the depression angle corresponding to the virtual image visual recognition distance to a depression angle based on the operation of the viewer, after adjusting the depression angle corresponding to the virtual image visual recognition distance to a depression angle based on the operation of the viewer and in a case that the virtual image visual recognition distance changes and changed virtual image visual recognition distance is in a first section set in distance longer than the reference distance, setting the depression angle, and after adjusting the depression angle corresponding to the virtual image visual recognition distance to a depression angle based on the operation of the viewer and in a case that the virtual image visual recognition distance changes and changed virtual image visual recognition distance is in a second section set in distance equal to or shorter than the reference distance, setting the depression angle based on the control mode.

14. The display device according to claim 13, comprising:
wherein, in a case that the virtual image visual recognition distance changes and the changed virtual image visual recognition distance is in a second section set in distance equal to or shorter than the reference distance, setting the depression angle based on the control mode that was set before the first receptor receives the operation of the viewer that increases the depression angle.

* * * * *